(12) United States Patent
Chaturvedi

(10) Patent No.: US 12,229,524 B2
(45) Date of Patent: Feb. 18, 2025

(54) SYSTEMS AND METHODS FOR HIERARCHICAL MULTI-LABEL MULTI-CLASS INTENT CLASSIFICATION

(71) Applicant: Capital One Services, LLC, McLean, VA (US)

(72) Inventor: Isha Chaturvedi, Mountain View, CA (US)

(73) Assignee: Capital One Services, LLC, McLean, VA (US)

( * ) Notice: Subject to any disclaimer, the term of this patent is extended or adjusted under 35 U.S.C. 154(b) by 164 days.

(21) Appl. No.: 17/818,708

(22) Filed: Aug. 9, 2022

(65) Prior Publication Data
US 2024/0054298 A1 Feb. 15, 2024

(51) Int. Cl.
*G06F 40/56* (2020.01)

(52) U.S. Cl.
CPC .................................. *G06F 40/56* (2020.01)

(58) Field of Classification Search
None
See application file for complete search history.

(56) References Cited

U.S. PATENT DOCUMENTS

| | | | |
|---|---|---|---|
| 11,270,077 B2* | 3/2022 | Tan | G06N 20/00 |
| 11,507,750 B2* | 11/2022 | Sapugay | G06F 16/2465 |
| 2017/0097966 A1* | 4/2017 | Kozareva | G06Q 30/02 |
| 2020/0143247 A1* | 5/2020 | Jonnalagadda | G06N 3/044 |
| 2020/0151253 A1* | 5/2020 | Wohlwend | G06N 3/044 |
| 2021/0295203 A1* | 9/2021 | Liao | G06N 3/006 |
| 2022/0300716 A1* | 9/2022 | Sabharwal | G06F 16/24578 |
| 2023/0114897 A1* | 4/2023 | Beaver | G06F 40/30 704/9 |
| 2023/0351184 A1* | 11/2023 | Di Fabbrizio | G06F 18/2155 |

OTHER PUBLICATIONS

Larson et al. "A survey of Intent Classification and Slot-Filling Datasets for Task-Oriented Dialog". arXiv:2207.13211v1 [cs.CL] Jul. 26, 2022 (Year: 2022).*

\* cited by examiner

*Primary Examiner* — Jesse S Pullias
(74) *Attorney, Agent, or Firm* — Foley & Lardner LLP

(57) ABSTRACT

Methods and systems are described herein for efficiently labeling user utterances, which may encompass any communication received from a user within a conversational interaction, and identifying novel user intents for large amounts of data. A machine learning model may be used, which is trained on embeddings of utterance data, and which may employ methods like prototypical networks and hierarchical local binary classification for hierarchical multi-label multi-class classification.

18 Claims, 6 Drawing Sheets

SYSTEMS AND METHODS FOR HIERARCHICAL MULTI-LABEL MULTI-CLASS INTENT CLASSIFICATION

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence often relies on large amounts of high-quality data. The process for obtaining this data and ensuring it is high-quality is often complex and time-consuming. Second, despite the mainstream popularity of artificial intelligence, practical implementations of artificial intelligence require specialized knowledge to design, program, and integrate artificial intelligence-based solutions, which limits the amount of people and resources available to create these practical implementations. Finally, results based on artificial intelligence are notoriously difficult to review as the process by which the results are made may be unknown or obscured. This obscurity creates hurdles for identifying errors in the results, as well as improving the models providing the results. These technical problems present an inherent problem with attempting to use an artificial intelligence-based solution in efficiently labeling user actions in an interactive conversational system.

SUMMARY

Methods and systems are described herein for novel uses and/or improvements of artificial intelligence applications. As one example, methods and systems are described herein for efficiently labeling user utterances, which may encompass any communication received from a user within a conversational interaction, and identifying novel user intents for large amounts of data. The methods and system may do so by applying semi-supervised intent discovery with contrastive learning to hierarchical clustering using prototypical networks.

Existing systems, when attempting a hierarchical structure, have to manually attach multiple labels to a parent class and its corresponding child classes for each utterance. That is a very costly solution considering the vast amounts of utterance data, and the multitude of labels that can be attached to each parent and/or child class. However, the difficulty in adapting artificial intelligence models for this practical benefit faces several technical challenges, such as the inherent difficulty of hierarchical classification, the lack of readily labeled utterance data, the unbalanced nature of the available data (both in distribution and in frequency), and the challenging uncertainty of discovering new intents.

To overcome these technical deficiencies in adapting artificial intelligence models for this practical benefit, methods and systems are disclosed for labeling user utterances during a conversational interaction within the framework of a multi-class multi-label classification problem. The methods and systems overcome the technical deficiencies by using a machine learning model trained to correctly identify intent class on unlabeled data, based on embeddings of labeled patent classes and labeled child classes. That is, the methods and system may use a machine learning model to identify parent classes based on embeddings of existing parent classes and labeled child classes corresponding to one or more of the existing parent classes. By doing so, the system may avoid having to manually attach multiple labels to a parent class and its corresponding child classes for each utterance.

More specifically, the methods and systems may perform hierarchical clustering using a prototypical network that embeds data around a prototype representation of labels first for parent classes and then their respective children classes. This method is metric-based, which can be used despite imbalances in the data. As such, the methods and systems avoid a common issue in machine learning applications, namely a lack of training data.

In addition to avoiding manual labeling, the methods and systems also mitigate intent distribution shift after model deployment. For example, new intent discovery is achieved via frequent training on recent data. New user utterances are embedded using pre-trained and fine-tuned embeddings, and if the distance from a closest prototype exceeds a pre-set threshold, a potential new intent is identified within this utterance. For example, as opposed to modifying traits of existing parent classes to include new data, the methods and system may detect new classes for this new data. By doing so, the integrity of prior classes is not negatively affected.

In some aspects, systems and methods are described herein for labeling user utterances during a conversational interaction within the framework of a multi-class multi-label classification problem. The system may receive, from a first user, a first user action during a conversational interaction with a user interface, wherein the first user action comprises a text-based communication, wherein the conversational interaction comprises an interactive exchange of text messages between the first user and a mobile application. The system may generate a first feature input based on the first user action, wherein the first feature input is an embedding, based on natural language processing, of contents of the first user action. The system may input the first feature input into a first machine learning model, wherein the first machine learning model comprises a model trained to identify user intents based on embeddings of existing intent parent classes and labeled child intent classes corresponding to one or more of the existing intent parent classes. The system may receive a first output from the first machine learning model, wherein the first output comprises a label classification for the first feature input. The system may determine whether the first feature output corresponds to a new intent. The system may generate for display, at the user interface during the conversational interaction, a first dynamic conversational response based on determining that the first feature output corresponds to the new intent.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
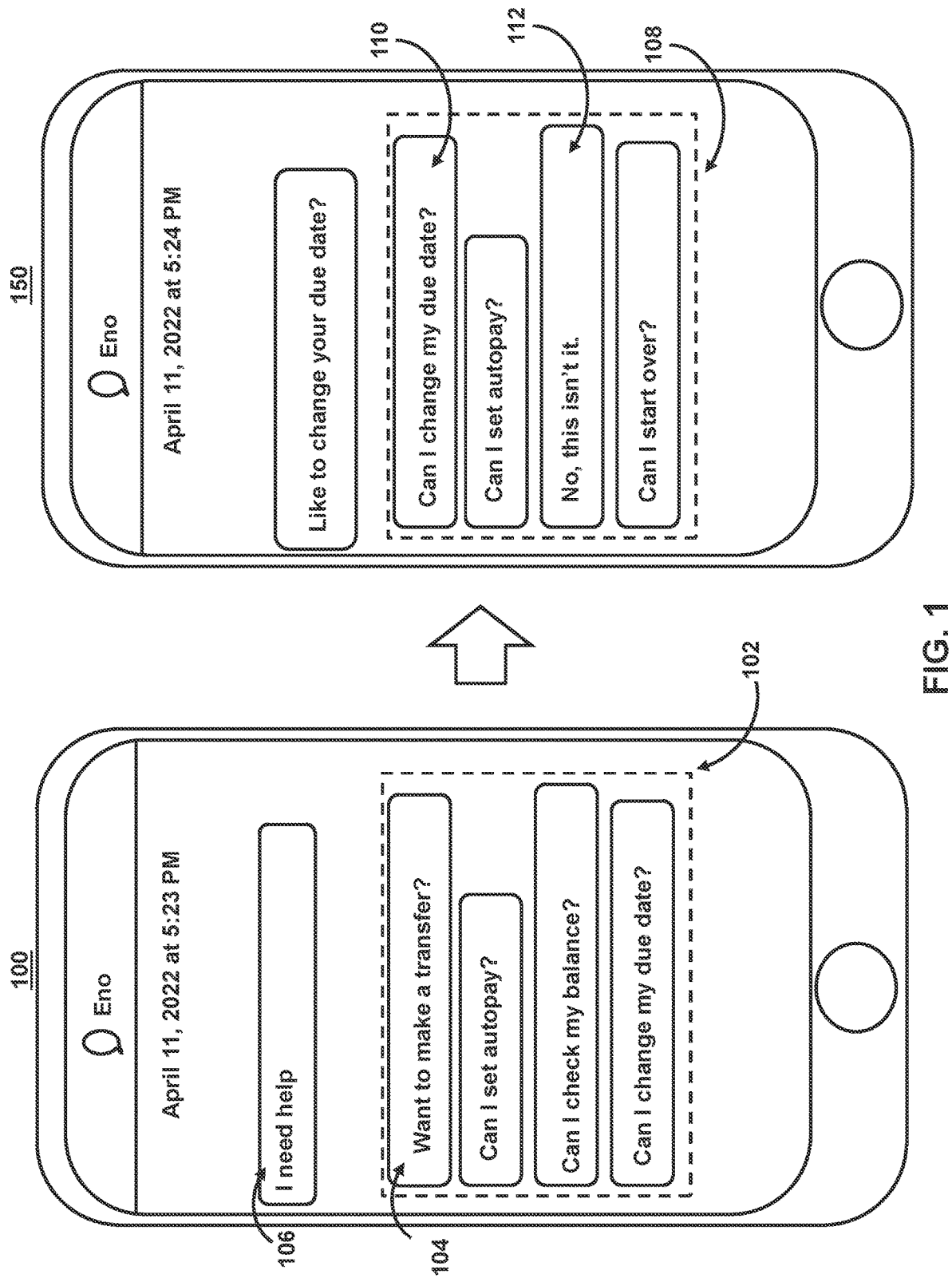
FIG. 1 shows an illustrative user interface for presenting dynamic conversational responses using machine learning models, in accordance with one or more embodiments.

FIG. 1 shows an illustrative user interface for presenting dynamic conversational responses using machine learning models, in accordance with one or more embodiments. For example, FIG. 1 shows user interface 100 and user interface 150. The system (e.g., a mobile application and/or messaging application) may generate and respond to user interactions in a user interface (e.g., user interface 100) in order to engage in a conversational interaction with the user. The conversational interaction may include a back-and-forth exchange of ideas and information between the system and the user. The conversational interaction may proceed through one or more mediums (e.g., text, video, audio, etc.). For example, the system may use one or more artificial intelligence models (including machine learning models, neural networks, etc.), referred to herein collectively as machine learning models or simply "models." The system may use any number of methods including, but not limited to, neural networks, natural language processing, and prototype networks to more accurately assess user intents and/or the similarity between user intents. For example, a user intent may refer to an intent and/or goal of a user. This goal or intent may be selected from a plurality of goals and/or intents stored by the system. For example, the system may determine that users who ask different questions about payment have similar account information and/or digital activities. The system may further determine that the users tend to be different from those of users who have a one-off type request, such as lost card reports or travel notification.

In some embodiments, a user intent may be the user's need underlying a conversational interaction with the system. In some embodiments, a user intent may be to pay a balance on an account, to deposit a check, or to request a loan. In some embodiments, the system may label user intents as "small-amount personal finance request", "inquiry for account balance", among other possibilities.

As referred to herein, a "user interface" may comprise a human-computer interaction and communication in a device, and it may include display screens, keyboards, a mouse, and the appearance of a desktop. For example, a user interface may comprise a way a user interacts with an application or a website.

In order to maintain the conversational interaction, the system may need to generate responses (e.g., a conversational response) dynamically and/or in substantially real time. For example, the system may generate responses within the normal cadence of a conversation. In some embodiments, the system may continually determine a likely intent of the user in order to generate responses (e.g., in the form of prompts, notifications, and/or other communications) to the user. It should be noted that a response may include any step or action (or inaction) taken by the system, including computer processes, which may or may not be perceivable to a user. Furthermore, the response may include any type of content. The system's ability to generate pertinent and timely responses to user action is an important business need.

As referred to herein, "content" may mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user. Such content may be salient to models referred to herein that are meant to gauge an intent behind a piece of user content.

For example, in response to a user action—which in some embodiments may comprise a user logging onto an application that generates user interface 100, inputting a query (e.g., query 106) into user interface 100, and/or a prior action (or lack thereof) by a user to a prior response generated by the system—the system may take one or more steps to generate dynamic conversational responses (e.g., response 104). These steps may include retrieving data about the user, retrieving data from other sources, monitoring user actions, and/or other steps in order to generate a feature input (e.g., as discussed below). In some embodiments, the system may generate a plurality of responses (e.g., responses 102). The system may use its determination of user intent to inform what responses are offered.

In some embodiments, the feature input may include a vector that describes various information about a user, a user action, and/or a current or previous interaction with the user. The system may further select the information for inclusion in the feature input based on a predictive value. The information may be collected actively or passively by the system and compiled into a user profile.

In some embodiments, the information (e.g., a user action) may include conversation details, such as information about a current session, including a channel or platform (e.g., desktop web, iOS, or mobile), a launch page (e.g., the webpage that the application was launched from), a time of launch, and/or activities in a current or previous session before launching the application. The system may store this information, and all the data about a conversational interaction may be available in real time via HTTP messages and/or through data streaming or from more sources (e.g., via an API.).

In some embodiments, the information (e.g., a user action) may include user account information, such as the types of accounts the user has; other accounts on file, such as bank accounts for payment; and information associated with accounts, such as credit limit, current balance, due date, recent payments, or recent transactions. The system may obtain this data in real time for model prediction through enterprise APIs.

In some embodiments, the information (e.g., a user action) may include insights about users provided to the application (e.g., via an API) from one or more sources, such as qualitative or quantitative representations (e.g., a percent) of a given activity (e.g., online spending) in a given time period (e.g., six months), upcoming actions (e.g., travel departure, pay day, leave, and/or family event) for a user, information about third parties (e.g., merchants, ranked by the number of transactions, over the last year for the user), etc.

Figure 2A:
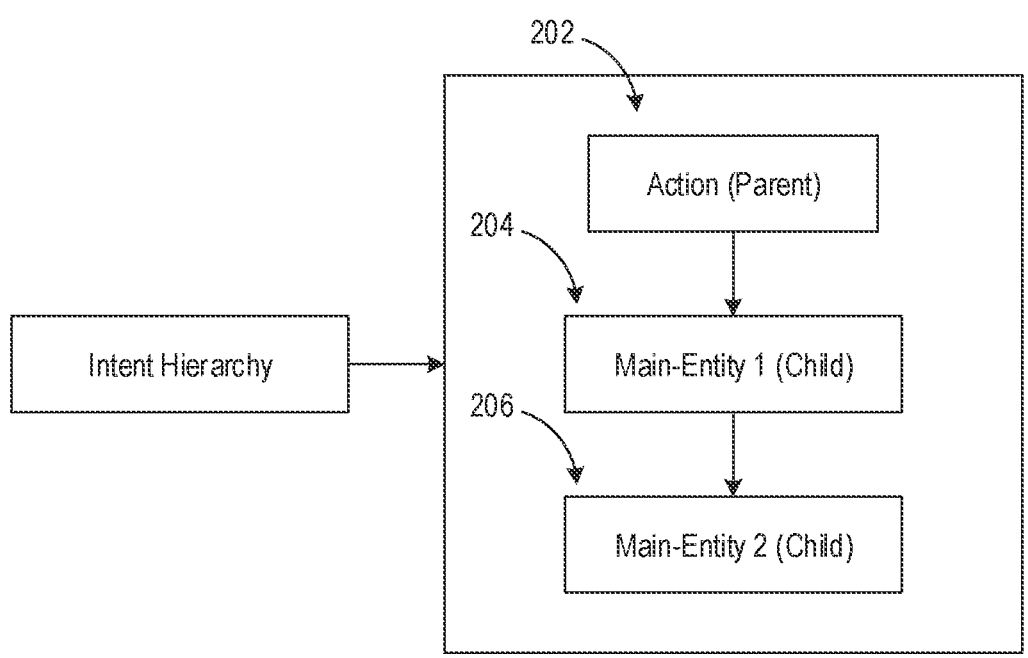
FIGS. 2A-2C show an illustrative diagram for demonstrating the training of a machine learning model, in accordance with one or more embodiments.

FIG. 2A is an illustrative diagram to demonstrate the intended architecture to represent label classes. A user intent, which the system will attempt to label with one or more classes, can be represented as a parent class with child classes attached to it in a hierarchy. For example, component 202 shows a parent class which represents a user action. Components 204 and 206 are attached to component 202 in a hierarchical fashion because they are its child classes. For example, the child classes in components 204 and 206 can be "main entities," which may contain information used to assist in identifying the parent class 202. In some embodiments, the child classes may contain contextual information about the conversational interaction or user profile pertinent to the parent class. This intent hierarchy is desirable because it allows for a more accurate classification of user intents and enables the model-based classification of new intents.

In some embodiments, child classes may comprise a subset of a parent class. Alternatively or additionally, the child and parent classes may have one or more overlapping characteristics. For example, the child and parent classes may include characteristics that cause the child and parent classes to be included in one or more clusters.

Figure 2B:
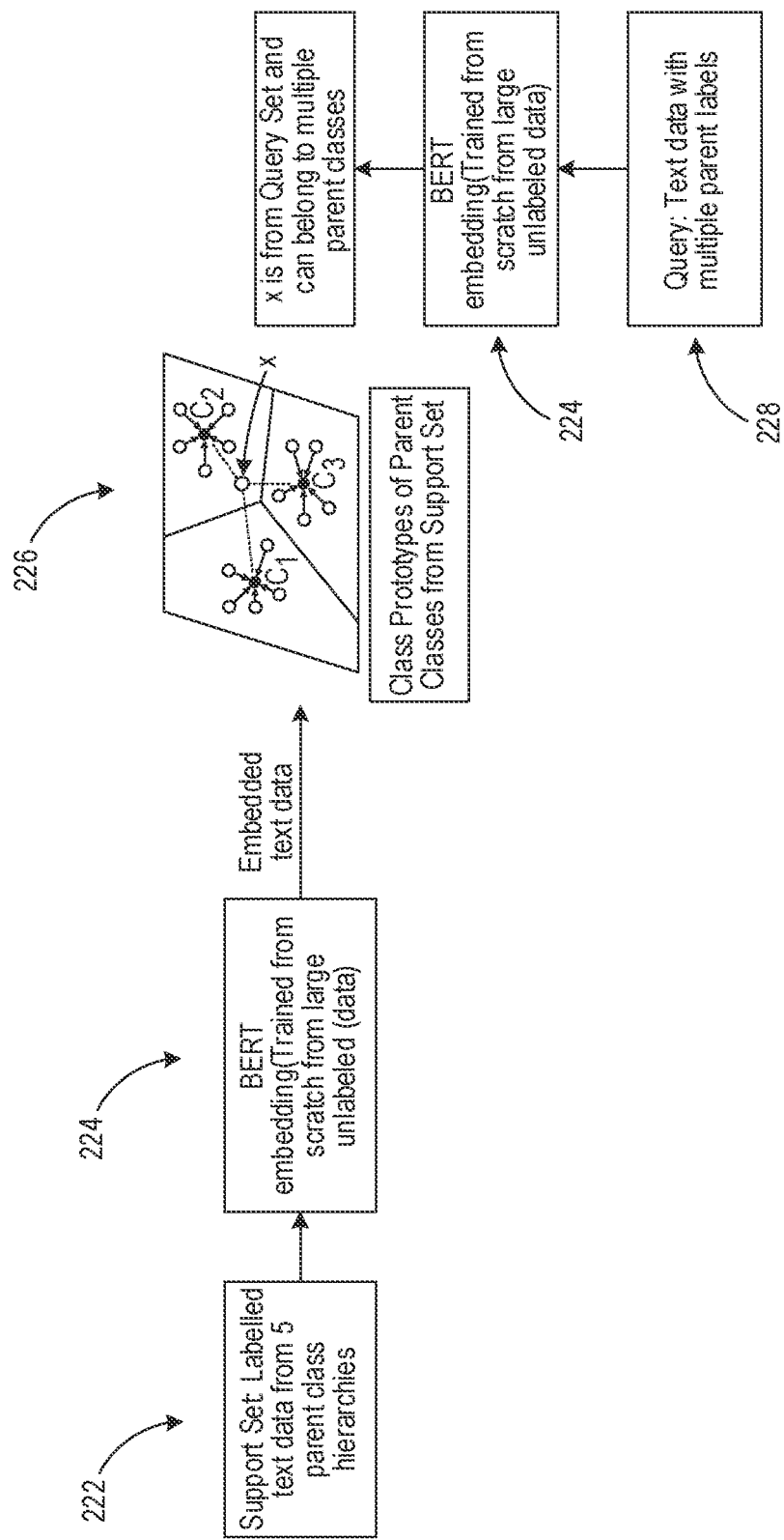

FIG. 2B is an illustrative diagram of one series of processes by which the first machine learning model may be trained. In some embodiments, this first model may take the form of a prototypical network and may be used to classify parent classes. In process 222, a "support set" is created by taking relevant text data, consisting of user utterances or any other communication by text in an interactive conversational context, and compiling the parent class hierarchical structure of the data into a training set. For example, such a support set can be a dataset of user texts indicating a variety of intents and surrounding a variety of user actions. Then in process 224, the system will apply an embedding to the support set which maps it from text data into an embedding space of vectors. An embedding may be a mathematical or software function which takes text data as input and outputs a numerical vector.

Such an embedding may be achieved, for example, by training a language model on large amounts of unlabeled user utterance data. For example, an embedding may be trained using a Bidirectional Encoder Representations from Transformers language processing model as a transfer learning process, or a neural network, in some embodiments. In process 226, the system may determine a prototypical network containing class prototypes based on embeddings of the support set data. For example, the system may identify clusters within the data, and choose the epicenter of each cluster to be a prototype representation of that label class. As can be seen on the figure for process 226, the three clusters of points each correspond to a label class domain, and the black dot at the center of each are the class prototypes. In process 228, a query set may be compiled of user utterance data points which need to be identified. Then, process 224 may be performed on this query set to map it into the embedding space. This embedding may be the same process as above, and may utilize the same models. The system may then perform classification on the embedded query set for its parent labels. For example, the system may utilize any part of the trained model to make determinations for a query set. In some embodiments, the prototypical network of process 226 can inform these determinations. For example, the system may compare the distance of an embedded query set data point to its closest class prototype against a pre-set threshold to identify a potential new label class. The distance comparisons can also inform what existing label, or multiple labels, should be applied to a query set data point.

Figure 2C:
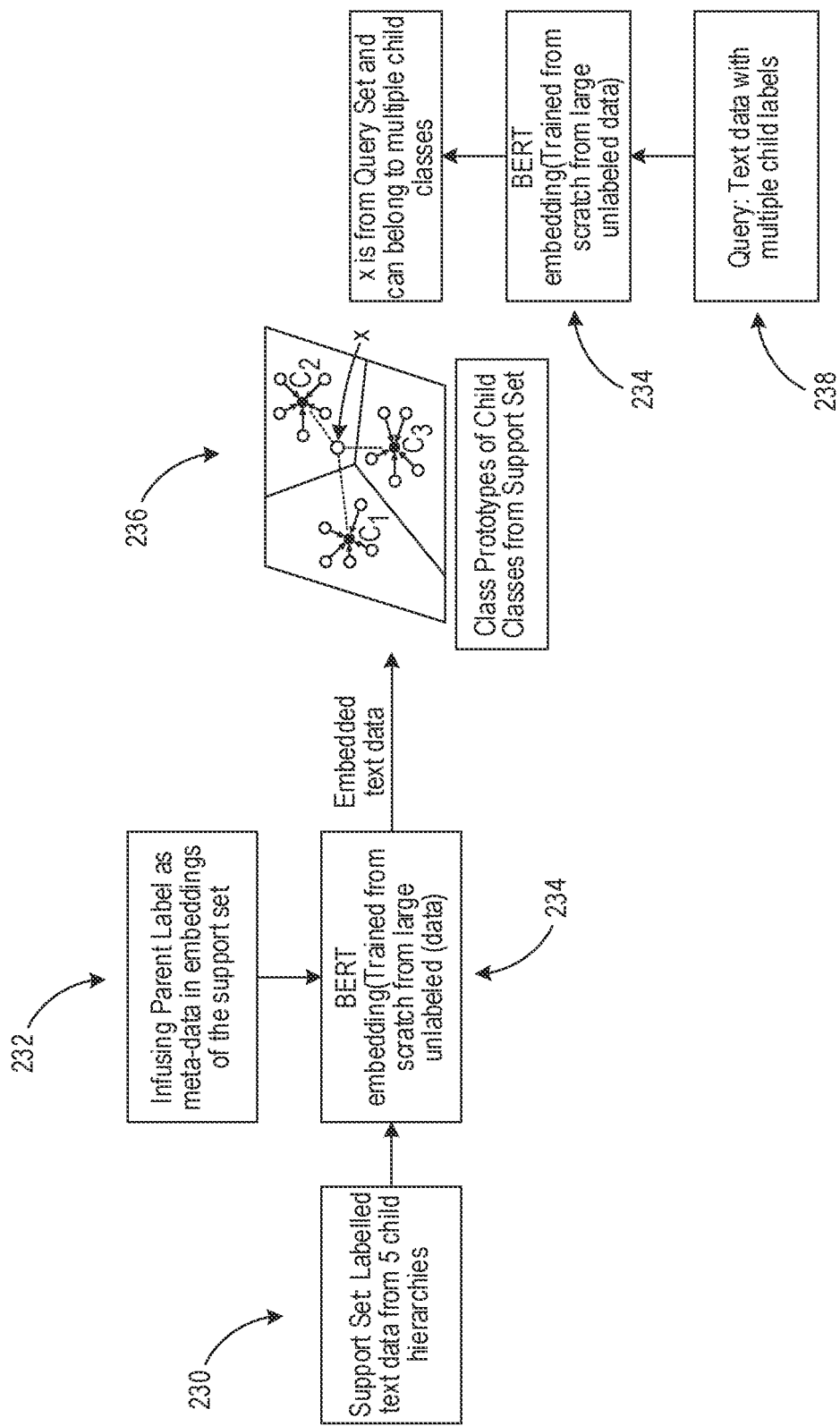

FIG. 2C is an illustrative diagram of another series of processes by which the first machine learning model may be trained to be applied for a different purpose. In some embodiments, this first model may take the form of a prototypical network and may be used to classify child classes. In process 230, a "support set" may be created by taking relevant text data, consisting of user utterances or any other communication by text in an interactive conversational context, and compiling the parent class hierarchical structure of the data into a training set. For example, such a support set can be a dataset of user texts indicating a variety of intents and surrounding a variety of user actions. In process 232, the system may infuse metadata regarding the parent class of these child classes in the support set into the dataset prior to performing embedding. This injection of parent data is to offer more comprehensive information for the embedding process. Then in process 234, the system may apply an embedding to the support set which maps it from text data into an embedding space of vectors. Such an embedding may be achieved, for example, by training a language model on large amounts of unlabeled user utterance data. For example, an embedding may be trained using a Bidirectional Encoder Representations from Transformers language processing model as a transfer learning process, or a neural network, in some embodiments. In process 236, the system may determine class prototypes based on embeddings of the support set data. For example, the system may identify clusters within the data, and choose the epicenter of each cluster to be a prototype representation of that label class. As can be seen on the figure for process 236, the three clusters of points each correspond to a label class domain, and the black dot at the center of each are the class prototypes. In process 238, a query set may be compiled of user utterance data points which need to be identified. Then, process 234 may be performed on this query set to map it into the embedding space. This embedding may be the same process as above, and may utilize the same models. The system may then perform classification on the embedded query set for its child labels. For example, the system may utilize any part of the trained model to make determinations for a query set. In some embodiments, the prototypical network of process 236 can inform these determinations. For example, the system may compare the distance of an embedded query set data point to its closest class prototype against a pre-set threshold to identify a potential new child label class. The distance comparisons can also inform what existing label, or multiple labels, should be applied to a query set data point.

Figure 3:
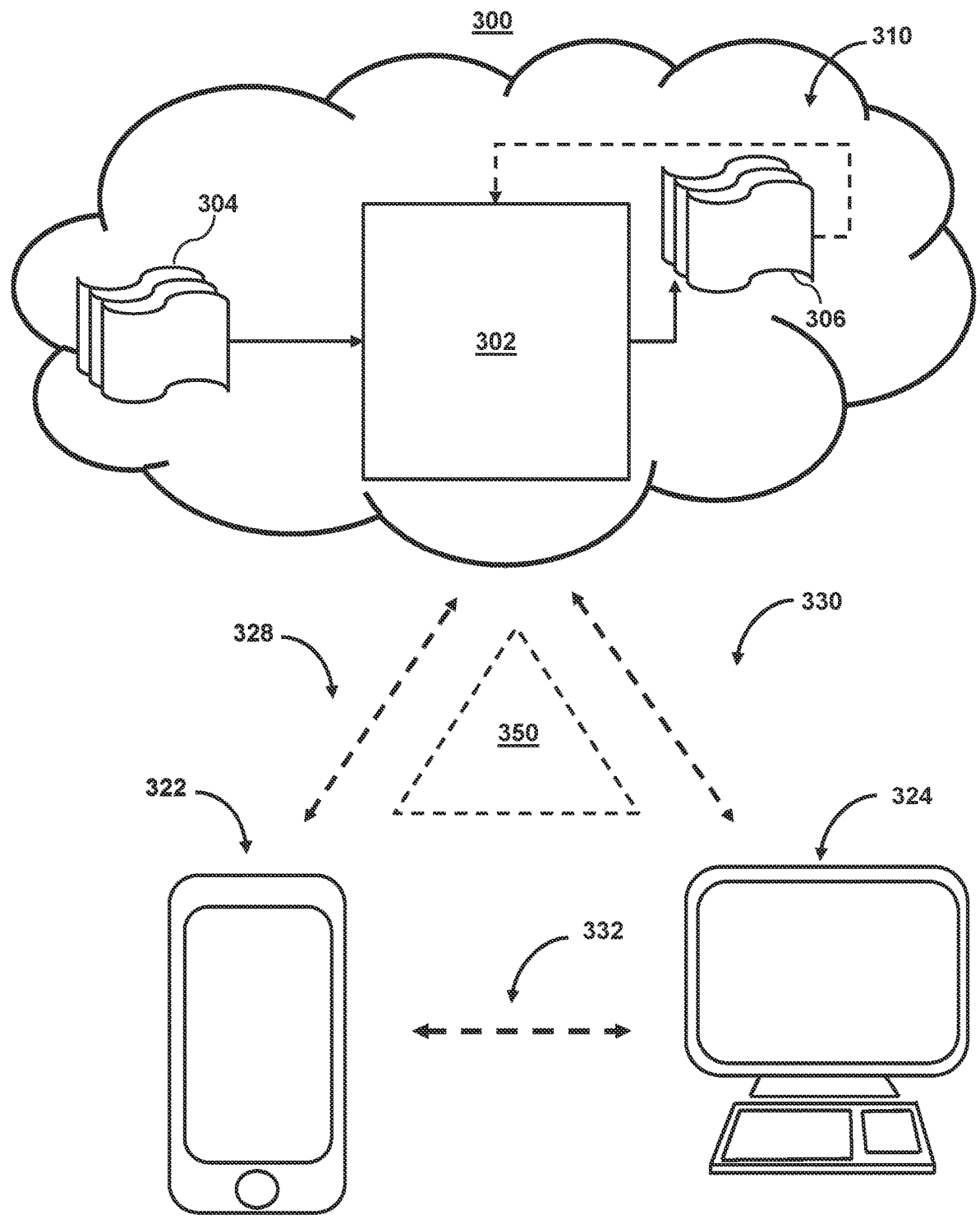
FIG. 3 is an illustrative system for generating dynamic conversational responses, in accordance with one or more embodiments.

FIG. 3 is an illustrative system for generating dynamic conversational responses, in accordance with one or more embodiments. For example, system 300 may represent the components used for generating real-time dynamic conversational responses during conversational interactions using machine learning models based on historic intents for a plurality of users and user-specific interactions. For example, past interactions with a plurality of users may be labeled with the correct intent for each interaction, and such data may be stored in a training database of historic intents. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, or other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., based on recommended contact strategies).

Additionally, as mobile device 322 and user terminal 324 are shown as touchscreen devices, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic conversational responses using machine learning models.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 4G or LTE network), a cable network, a public switched telephone network, or other types of communication networks or combinations of communication networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior transactions. Alternatively, or additionally, the system may act as a clearinghouse for multiple sources of information about the user. Cloud components 310 may also include control circuitry configured to perform the various operations needed to generate recommendations. For example, the cloud components 310 may include cloud-based storage circuitry configured to store a first machine learning model that is trained to select a dynamic conversational response from a plurality of dynamic conversational responses based on a first feature input. Cloud components 310 may also include cloud-based control circuitry configured to determine an intent of the user based on a machine learning model. Cloud components 310 may also include cloud-based I/O circuitry configured to generate the dynamic conversational response during a conversational interaction.

Cloud components 310 include machine learning model 302. Machine learning model 302 may take inputs 304 and provide outputs 306. The inputs may include multiple datasets, such as a training dataset and a test dataset. Each of the plurality of datasets (e.g., inputs 304) may include data subsets related to user data, contact strategies, and results. In some embodiments, outputs 306 may be fed back to machine learning model 302 as input to train machine learning model 302 (e.g., alone or in conjunction with user indications of the accuracy of outputs 306, with labels associated with the inputs, or with other reference feedback information). For example, the system may receive a first labeled feature input, wherein the first labeled feature input is labeled with a known dynamic conversational response for the first labeled feature input. The system may then train the first machine learning model to classify the first labeled feature input with the known dynamic conversational response.

In another embodiment, machine learning model 302 may update its configurations (e.g., weights, biases, or other parameters) based on the assessment of its prediction (e.g., outputs 306) and reference feedback information (e.g., user indication of accuracy, reference labels, or other information). In another embodiment, where machine learning model 302 contains a neural network, connection weights may be adjusted to reconcile differences between the neural network's prediction and the reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions.

In some embodiments, machine learning model 302 may include an artificial neural network. In such embodiments, machine learning model 302 may include an input layer and one or more hidden layers. Each neural unit of machine learning model 302 may be connected with many other neural units of machine learning model 302. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function that the signal must surpass before it propagates to other neural units. Machine learning model 302 may be self-learning and trained, rather than explicitly programmed, and can perform significantly better in certain areas of problem solving, as compared to traditional computer programs. During training, an output layer of machine learning model 302 may correspond to a classification of machine learning model 302 and an input known to correspond to that classification may be input into an input layer of machine learning model 302 during training. During testing, an input without a known classification may be input into the input layer, and a determined classification may be output.

In some embodiments, machine learning model 302 may include multiple layers (e.g., where a signal path traverses from front layers to back layers). In some embodiments, backpropagation techniques may be utilized by machine learning model 302 where forward stimulation is used to reset weights on the "front" neural units. In some embodiments, stimulation and inhibition for machine learning model 302 may be more free-flowing, with connections interacting in a more chaotic and complex fashion. During testing, an output layer of machine learning model 302 may indicate whether or not a given input corresponds to a classification of machine learning model 302 (e.g., whether a first length of time corresponds to lengths of programming time for previously completed stories by contributors without a required skill).

In some embodiments, model 302 may be a machine learning model that uses a prototypical network with typical representations of each class in an embedding space. Model 302 may use an embedding which may, for example, be trained by a language model on large amounts of unlabeled user utterance data. For example, an embedding may be trained using a Bidirectional Encoder Representations from Transformers language processing model as a transfer learning process, or a neural network, in some embodiments. This embedding may be deployed to map a "support set" of relevant text data from users into an embedding space of vectors. In this embedding space, a prototypical network may learn class prototypes based on the support set. For example, it may determine an epicenter for each cluster of datapoints in the support set on the embedding space.

Model 302 may be used on a query set of user utterance data points which need to be identified. Model 302 may perform classification on the embedded query set for its class labels. For example, in the prototypical network implementations, the system may compare the distance of an embedded query set data point to its closest class prototype against a pre-set threshold to identify a potential new label class. The distance comparisons can also inform what existing label, or multiple labels, should be applied to a query set data point.

In some other embodiments, model 302 may use the structure of hierarchical local binary classification. This is a top-down approach where the model will begin classification at the top of the taxonomy tree, which is the parent class, and only proceeding to a child class after performing classification for its predecessors. These embodiments will also use embeddings of the text data, which may be trained using a Bidirectional Encoder Representations from Transformers language processing model as a transfer learning process, or a neural network. After embedding the data, a local binary classifier is trained at each level in the hierarchy, and model 302 may make label predictions using a feed forward classifier as the output layer.

System 300 also includes API layer 350. API layer 350 may allow the system to generate recommendations across different devices. In some embodiments, API layer 350 may be implemented on user device 322 or user terminal 324. Alternatively, or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer. Where microservices reside, in this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use strong security constraints applying WAF and DDoS protection, and API layer 350 may use RESTful APIs as standard for external integration.

Figure 4:
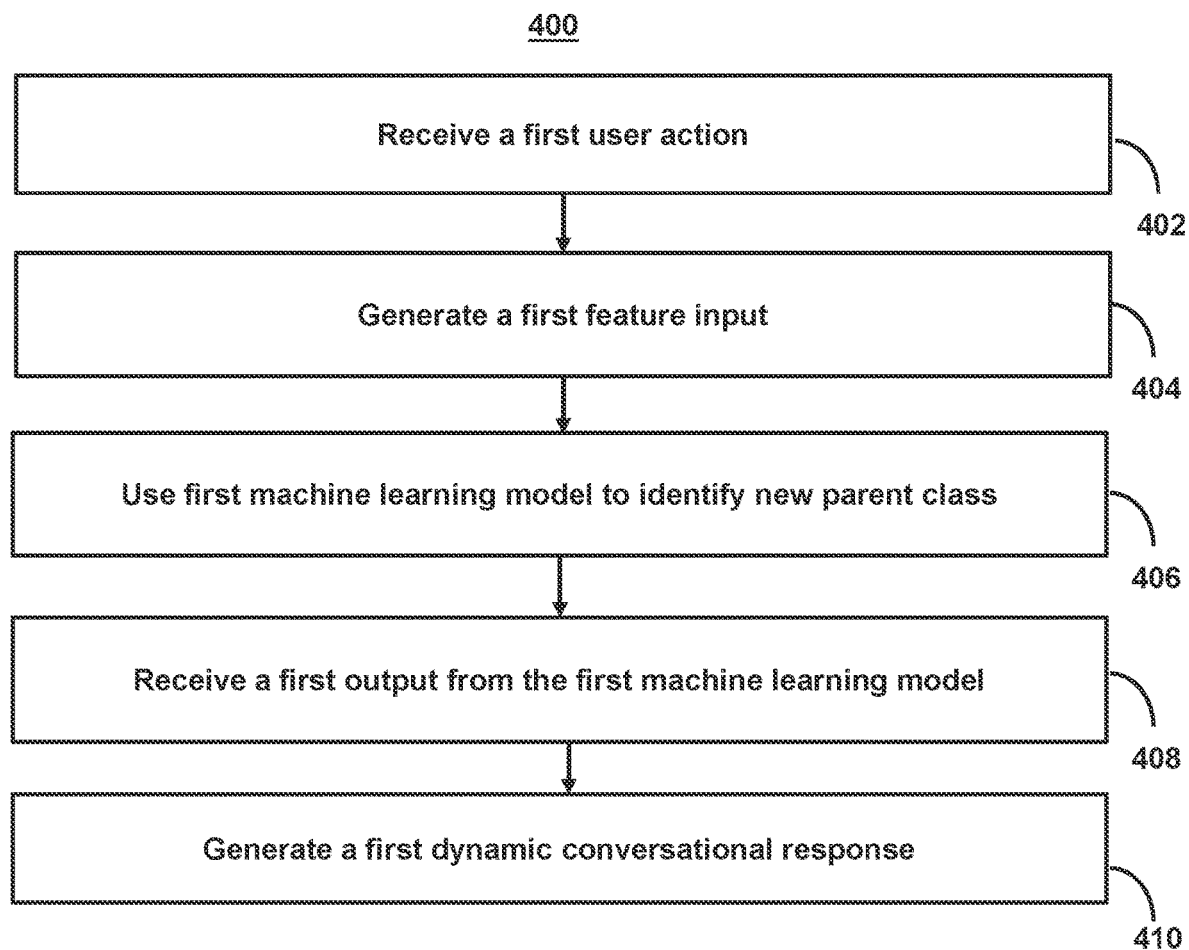
FIG. 4 shows a flowchart of the steps involved in generating the output of the first machine learning model, in accordance with one or more embodiments.

FIG. 4 shows a flowchart of the steps involved in identifying user intent during conversational interactions using machine learning models based on historic intent labeling for a plurality of users and user-specific interactions, in accordance with one or more embodiments. For example, process 400 may represent the steps taken by one or more devices as shown above.

At step 402, process 400 (e.g., using one or more components in system 300 (FIG. 3)) receives a first user action. For example, the system may receive a first user action during a conversational interaction with a user interface. For example, the system may receive a user action as described in FIG. 1. By doing so, the system may ensure that a hierarchical structure to the user action provides a comprehensive and accurate representation of the user utterance for the purposes of embedding later. The system may also turn this user utterance into usable training data for use in further fine-tuning the system.

At step 404, process 400 (e.g., using one or more components in system 300 (FIG. 3)) generates a first feature input. The system may apply natural language processing to textual input. For example, it may retrieve a pre-trained language model to determine embeddings that map the first user action into an embedding space of real-valued vectors. The system may later input the first feature input into a first machine learning model. By doing this embedding, the system may convert possibly divergent information into the same space for comparison and contrast.

The system may train the first machine learning model-based on training data. For example, the system may train a prototypical network that learns a class prototype for each class represented in the training data. In some embodiments, the system may rely on various types of labeled data to perform clustering. For example, the system may create a support vector, which is a dataset of labeled utterance data that can be used to fine-tune embeddings trained from a neural network. The system may use a language model like Bidirectional Encoder Representations from Transformers to perform embedding on the support vector and transform the utterance data into the embedding space of the real-valued vectors. By doing so, the system may ensure consistency between the first textual input and the support vector for ease of reference to class prototypes.

For example, the system may compile a query vector of unlabeled data for which parent classes may be predicted. For example, the system may label each existing parent class with corresponding child classes. The system may infuse the parent label as metadata into the embeddings of its main entities. For example, the system may perform hierarchical clustering using the prototypical network that embeds data around a prototype representation of labels for the existing parent classes and the corresponding child classes. By doing so, the system may account for imbalances in the data because the prototype network method is metric-based.

The system may also engage in hierarchical local binary classification, wherein training the first machine learning model comprises using a local classifier enabled by preexisting embeddings and instructing a feed forward classifier that predicts labels for parent or child classes.

At step 406, process 400 (e.g., using one or more components in system 300 (FIG. 3)) determines a potential new parent class. For example, the system may determine a distance in the embedding space from any new data point, which may consist of a user action, to a closest class prototype. For example, the system may compare the distance against a pre-set or trained threshold to classify the new data point as either a new parent class, which in some embodiments may be a new intent label, or a previously identified parent class. By doing so, the system may discover a distinct parent class of user intent, and the system may determine its corresponding child classes. By doing so, the system may respond to the adapting needs of the user. The system may, after it identifies a parent class, infuse that parent label into the embedding prototype of its corresponding main entities and match the incoming utterance to the child classes, to identify the main entities. By doing so, the system may use a correct classification of the parent class to better inform the classification of child classes into main entities.

At step 408, process 400 (e.g., using one or more components in system 300 (FIG. 3)) receives the determination of step 406 on the intent that the first user is communicating and can relay the intent to one or more components in system 300. For example, if the user utterance has multiple labels attached, the system may select an appropriate selection of response choices based on one or more of the labels. For example, the system may use main entity information corresponding with the intent hierarchy to distinguish between possible responses to a user action. By doing so, the system may accurately identify, from a plurality of options, the accurate handling of the user intent.

At step 410, process 400 (e.g., using one or more components in system 300 (FIG. 3)) will generate a conversational response to the user which the system may appropriately select using the determination of intent from step 406, and communicating with one or more components in system 300 as in step 408. By doing so, the system may put to the test the accuracy of the intent identification. For example, the system may retrieve from the first user a second action during the conversation; the system may then generate a second feature input based on the second action, input the second feature input into the first machine learning model, receive a second output from the model, and generate a second conversational response. From the continued conversational interaction, the system may gauge from the user's response whether its intent identification has been accurate. This feedback is useful for continued training and fine-tuning of the system.

The present techniques will be better understood with reference to the following enumerated embodiments:

1. A method, the method comprising: receiving, from a first user, a first user action during a conversational interaction with a user interface; generating a first feature input based on the first user action; inputting the first feature input into a first machine learning model, wherein the first machine learning model comprises a model trained to identify new parent classes based on embeddings of existing parent classes and labeled child classes corresponding to one or more of the existing parent classes; receiving a first output from the first machine learning model; and generating for display, at the user interface during the conversational interaction, a first dynamic conversational response based on the first output.

2. The method of any one of the preceding embodiments, wherein the method is for generating real-time dynamic conversational responses during conversational interactions using machine learning models based on historic intents for a plurality of users and user-specific interactions.

3. The method of any one of the preceding embodiments, further comprising: labeling each existing parent class with corresponding child classes and performing hierarchical clustering using a prototypical network that embeds data around a prototype representation of labels for the existing parent classes and the corresponding child classes.

4. The method of any one of the preceding embodiments, wherein the first output comprises a distance between an embedding of the first feature input and parent class prototype, and wherein the method further comprises: retrieving a distance threshold for the first machine learning model; comparing the distance to the distance threshold; and in response to determining that the embedding of the first feature input and the parent class prototype is greater than the distance threshold, determining that the first feature input corresponds to a new intent.

5. The method of any one of the preceding embodiments, further comprising: determining a new parent class based on the new intent and determining corresponding child classes for the new parent class.

6. The method of any one of the preceding embodiments, further comprising: retrieving a pre-trained language model and fine-tuning a prototypical network using the pre-trained language model.

7. The method of any one of the preceding embodiments, wherein the first machine learning model is trained using few-shot learning, further comprising: a support vector, wherein a labeled set of example data is used to fine-tune embeddings of parent classes and a query vector of unlabeled data for which parent classes can be predicted using the embeddings.

8. The method of any one of the preceding embodiments, wherein the first machine learning model applies a prototypical network for hierarchical clustering by: training a neural network to perform embeddings on labeled support vector data; determining a prototype of a class from the embeddings of its members in the support vector; and performing a classification on the members of the query vector with reference to a nearest class prototype.

9. The method of any one of the preceding embodiments, wherein the first machine learning model comprises a hierarchical local binary classification system, and wherein training the first machine learning model comprises using a local classifier that uses preexisting embeddings as feed forward classifiers to predict labels for its corresponding parent class or child class.

10. The method of any one of the preceding embodiments, wherein the first user action comprises a textual input into the user interface, and wherein generating the first feature input based on the first user action comprises applying natural language processing to the textual input.

11. The method of any one of the preceding embodiments, further comprising: receiving, from the first user, a second user action during the conversational interaction with the user interface; generating a second feature input based on the second user action; inputting the second feature input into the first machine learning model; receiving a second output from the first machine learning model; and generating for display, at the user interface during the conversational interaction, a second dynamic conversational response based on the second output.

What is claimed is:

1. A system for generating real-time dynamic conversational responses during conversational interactions using machine learning models based on historic intents for a plurality of users and user-specific interactions, the system comprising:
   one or more processors; and
   a non-transitory, computer-readable medium comprising instructions that, when executed by the one or more processors, cause operations comprising:
      receiving, from a first user, a first user action during a conversational interaction with a user interface, wherein the first user action comprises a text-based communication, wherein the conversational interaction comprises an interactive exchange of text messages between the first user and a mobile application;
      generating a first feature input based on the first user action, wherein the first feature input is an embedding, based on natural language processing, of contents of the first user action;
      inputting the first feature input into a first machine learning model, wherein the first machine learning model comprises a model trained to identify user intents based on embeddings of existing intent parent classes and labeled child intent classes corresponding to one or more of the existing intent parent and child classes, wherein the first machine learning model comprises a hierarchical local binary classification system, and wherein training the first machine learning model comprises using a local classifier that uses preexisting embeddings as feed forward classifiers to predict labels for its corresponding parent class or child class;
      receiving a first output from the first machine learning model, wherein the first output comprises a label classification for the first input;
      determining whether the first output corresponds to a new intent; and
      generating for display, at the user interface during the conversational interaction, a first dynamic conversational response based on determining that the first feature output corresponds to the new intent.

2. A method for generating real-time dynamic conversational responses during conversational interactions using machine learning models based on historic intents for a plurality of users and user-specific interactions, the method comprising:
   receiving, from a first user, a first user action during a conversational interaction with a user interface;
   generating a first feature input based on the first user action;
   inputting the first feature input into a first machine learning model, wherein the first machine learning model comprises a model trained to identify parent classes based on embeddings of existing parent classes and labeled child classes corresponding to one or more of the existing parent classes, wherein the first machine learning model comprises a hierarchical local binary classification system, and wherein training the first machine learning model comprises using a local classifier that uses preexisting embeddings as feed forward classifiers to predict labels for its corresponding parent class or child class;

receiving a first output from the first machine learning model; and generating for display, at the user interface during the conversational interaction, a first dynamic conversational response based on the first output.

3. The method of claim 2, further comprising:

labeling each existing parent class with corresponding child classes; and performing hierarchical clustering, using a prototypical network that embeds data around a prototype representation of labels for the existing parent classes and the corresponding child classes.

4. The method of claim 2, wherein the first output comprises a distance between an embedding of the first feature input and a parent class prototype, and wherein the method further comprises:

retrieving a distance threshold for the first machine learning model;

comparing the distance to the distance threshold; and in response to determining that the embedding of the first feature input and the parent class prototype is greater than the distance threshold, determining that the first feature input corresponds to a new intent.

5. The method of claim 4, further comprising:

determining a new parent class based on the new intent; and determining corresponding child classes for the new parent class.

6. The method of claim 2, further comprising:

retrieving a pre-trained language model; and fine-tuning a prototypical network using the pre-trained language model.

7. The method of claim 2, wherein the first machine learning model is trained using few-shot learning, comprising:

a support vector, wherein a labeled set of example data is used to fine-tune embeddings of parent classes; and a query vector of unlabeled data for which parent classes can be predicted using the embeddings.

8. The method of claim 7, wherein the first machine learning model applies a prototypical network for hierarchical clustering by:

training a neural network to perform embeddings on labeled support vector data;

determining a prototype of a class from the embeddings of its members in the support vector; and performing a classification on the members of the query vector with reference to a nearest class prototype.

9. The method of claim 2, wherein the first user action comprises a textual input into the user interface, and wherein generating the first feature input based on the first user action comprises applying natural language processing to the textual input.

10. The method of claim 2, further comprising:

receiving, from the first user, a second user action during the conversational interaction with the user interface;

generating a second feature input based on the second user action;

inputting the second feature input into the first machine learning model;

receiving a second output from the first machine learning model; and generating for display, at the user interface during the conversational interaction, a second dynamic conversational response based on the second output.

11. A non-transitory, computer-readable medium, comprising instructions that, when executed by one or more processors, cause operations comprising:

receiving, from a first user, a first user action during a conversational interaction with a user interface;

generating a first feature input based on the first user action;

inputting the first feature input into a first machine learning model, wherein the first machine learning model comprises a model trained to identify new parent classes based on embeddings of existing parent classes and labeled child classes corresponding to one or more of the existing parent classes using few-shot learning based on a support vector of a labeled set of example data that is used to fine-tune embeddings of parent classes and a query vector of unlabeled data for which parent classes can be predicted using the embeddings;

receiving a first output from the first machine learning model; and generating for display, at the user interface during the conversational interaction, a first dynamic conversational response based on the first output.

12. The non-transitory, computer-readable medium of claim 11, wherein the instructions further comprise:

labeling each existing parent class with corresponding child classes; and performing hierarchical clustering, using a prototypical network that embeds data around a prototype representation of labels for the existing parent classes and the corresponding child classes.

13. The non-transitory, computer-readable medium of claim 11, wherein the first output comprises a distance between an embedding of the first feature input and a parent class prototype, and wherein the instructions further comprise:

retrieving a distance threshold for the first machine learning model;

comparing the distance to the distance threshold; and in response to determining that the embedding of the first feature input and parent class prototype is greater than the distance threshold, determining that the first feature input corresponds to a new intent.

14. The non-transitory, computer-readable medium of claim 11, wherein the instructions further comprise:

retrieving a pre-trained language model; and fine-tuning a prototypical network using the pre-trained language model.

15. The non-transitory, computer-readable medium of claim 11, wherein the first machine learning model applies a prototypical network for hierarchical clustering by:

training a neural network to perform embedding on labeled support vector data;

determining a prototype of a class from the embeddings of its members in the support vector; and performing a classification on the members of the query vector with reference to a nearest class prototype.

16. The non-transitory, computer-readable medium of claim 11, wherein the first machine learning model comprises a hierarchical local binary classification system, and wherein training the first machine learning model comprises using a local classifier that uses preexisting embeddings as feed forward classifiers to predict labels for its corresponding parent class or child class.

17. The non-transitory, computer-readable medium of claim 11, wherein the first user action comprises a textual input into the user interface, and wherein generating the first feature input based on the first user action comprises applying natural language processing to the textual input.

18. The non-transitory, computer-readable medium of claim 11, wherein the instructions further comprise:
- receiving, from the first user, a second user action during the conversational interaction with the user interface;
- generating a second feature input based on the second user action;
- inputting the second feature input into the first machine learning model;
- receiving a second output from the first machine learning model; and
- generating for display, at the user interface during the conversational interaction, a second dynamic conversational response based on the second output.

* * * * *